US012604854B2

(12) United States Patent
Koechner et al.

(10) Patent No.: US 12,604,854 B2
(45) Date of Patent: Apr. 21, 2026

(54) ANIMAL TRANSPORT SYSTEM

(71) Applicant: Koechner MFG. CO., INC., Tipton, MO (US)

(72) Inventors: Jeramey Koechner, Tipton, MO (US); Clay Blake, Fortuna, MO (US)

(73) Assignee: Koechner MFG. CO., INC., Tipton, MO (US)

(*) Notice: Subject to any disclaimer, the term of this patent is extended or adjusted under 35 U.S.C. 154(b) by 0 days.

(21) Appl. No.: 19/228,163

(22) Filed: Jun. 4, 2025

(65) Prior Publication Data

US 2025/0374886 A1 Dec. 11, 2025

Related U.S. Application Data

(60) Provisional application No. 63/656,296, filed on Jun. 5, 2024.

(51) Int. Cl.
*A01K 1/00* (2006.01)

(52) U.S. Cl.
CPC .......... *A01K 1/0035* (2013.01); *A01K 1/0047* (2013.01)

(58) Field of Classification Search
CPC .. A01K 45/005; A01K 1/0052; A01K 1/0058; A01K 1/0064; A01K 1/0047; A01K 1/0035
See application file for complete search history.

(56) References Cited

U.S. PATENT DOCUMENTS

| | | | | |
|---|---|---|---|---|
| 2,260,999 A | * | 10/1941 | Mann | B61D 27/0081 454/103 |
| 2,610,567 A | * | 9/1952 | Davis | B60H 1/00014 454/103 |
| 3,752,529 A | | 8/1973 | Remke et al. | |

(Continued)

FOREIGN PATENT DOCUMENTS

| | | |
|---|---|---|
| CN | 215043172 U | 12/2021 |
| CN | 218141234 U | 12/2022 |

(Continued)

OTHER PUBLICATIONS

Curtainsider Inc, Live poultry Curtainsider® Systems, webpage, https://www.curtainsider.com/live-poultry-curtainsiderreg-systems.html#/, access date Jun. 6, 2025.

(Continued)

*Primary Examiner* — Monica L Perry
(74) *Attorney, Agent, or Firm* — AVEK IP, LLC; Jessica Lambert

(57) ABSTRACT

An animal transportation system forms a climate-controlled environment that includes one or more cage assemblies configured to accommodate one or more live animals to be transported therein. The one or more cage assemblies comprise a covering extending thereabove, a frame having a support laterally extending therefrom, and one or more doors supported spaced apart from the one or more cages by the support and movable between an open position and a closed position. One or more securement systems extend through an opening in a floor of the animal transportation system and flexibly secure the one or more cage assemblies to the floor. A circulation system is configured to affect environmental conditions of an interior of the animal transportation system. A control system may be coupled to the circulation system.

20 Claims, 5 Drawing Sheets

(56)            References Cited

U.S. PATENT DOCUMENTS

| | | | | |
|---|---|---|---|---|
| 4,023,529 | A * | 5/1977 | Landy .................... | A01K 1/031 |
| | | | | 55/482 |
| 4,099,764 | A | 7/1978 | Ratliff | |
| 4,454,837 | A | 6/1984 | Luebke | |
| 4,481,870 | A * | 11/1984 | Smith ............... | B60H 1/00295 |
| | | | | 454/88 |
| 4,726,196 | A * | 2/1988 | Zajic ....................... | F25D 17/06 |
| | | | | 62/239 |
| 6,581,544 | B1 | 6/2003 | Smith | |
| 8,794,187 | B2 | 8/2014 | Smith et al. | |
| 10,631,517 | B2 * | 4/2020 | Kim ................... | B60H 1/00564 |
| 10,959,395 | B2 | 3/2021 | Smith et al. | |
| 11,036,265 | B2 * | 6/2021 | Shelnutt ............... | G06F 1/3206 |
| 2008/0110409 | A1 | 5/2008 | Mennen | |
| 2008/0236508 | A1 * | 10/2008 | Seay .................... | A01K 31/002 |
| | | | | 24/68 R |
| 2014/0352625 | A1 * | 12/2014 | Reginhard ........... | A01K 1/0272 |
| | | | | 119/496 |
| 2016/0095290 | A1 * | 4/2016 | Reginhard ........... | A01K 1/0245 |
| | | | | 119/496 |

FOREIGN PATENT DOCUMENTS

| | | |
|---|---|---|
| EP | 3789243 A1 | 3/2021 |
| WO | 2005070198 A1 | 8/2005 |

OTHER PUBLICATIONS

Smithway Inc, Smithway Chicken Transport System, webpage, https://www.smithwayinc.com/products, access date Jun. 6, 2025.

HatchTraveller, HatchTraveller Chick Transport, webpage, https://hatchtraveller.com/hatchery-products/rigid-box/, access date Jun. 6, 2025.

Bright Coop Inc, Humane Aire: A New Day in Processing, webpage, https://www.brightcoop.com/humane-aire/, access date Jun. 6, 2025.

Bright Coop Inc, Fixed Turkey Racks: Bright Coop, Inc. is the authorized dealer for Viking Specialized Turkey Trailers., webpage, https://www.brightcoop.com/fixed-turkey-racks/, access date Jun. 6, 2025.

* cited by examiner

ANIMAL TRANSPORT SYSTEM

CROSS REFERENCE TO RELATED APPLICATION

This application claims the benefit of U.S. Provisional Patent Application No. 63/656,296 filed Jun. 5, 2024, the disclosure of which is hereby incorporated herein in its entirety by reference.

BACKGROUND OF THE INVENTION

Field of the Invention

The present invention relates generally to a system for transferring small animals, and more particularly, to a trailer and method for safely transporting and holding poultry.

Background

Poultry transport trailers are configured to support coops or cages that contain live poultry during transport from a farm to a processing center. Enclosed or curtain-sided trailers provide a functional and aesthetic solution that provide a variety of benefits, including protecting the poultry from exposure to the elements during transportation, providing climate-control through various means of ventilation, and preventing exposure of the caged, live animals to the public to shield the poultry industry from potential negative viewpoints that are associated with animal welfare.

Various solutions have been proposed for safely transporting live poultry or animals. For example, European Patent Publication No. 3,789,243 to Van Ravenhorst discloses a vehicle for transporting living animals in cages having an air flow generator at an end thereof that is powered by a power unit supported under the vehicle and curtain-type sidewalls comprising an integrated air supply duct with a plurality of openings for air flow through a gap that extends between the sidewalls and the cages. U.S. Pat. No. 10,959,395 to Smith et al. discloses a trailer for transporting fowl having a side wall comprising an accordion-like curtain made of an insulating fabric that is openable and closeable, and a conditioned air system housed at an end thereof in flow communication with an air supply duct system and communicatively connected to air sensors. PCT Patent Application Publication No. 200570198 to Meter discloses an insulated trailer for holding poultry that includes a climate chamber with an air circulation system for heating or cooling the trailer and doors that pivot open upwardly. U.S. Pat. No. 8,794,187 to Smith et al. discloses a trailer for transporting living fowl that includes sidewalls formed from openable accordion-like structures that may be formed from an insulated fabric. Conditioned air is supplied to a main air supply duct that runs along a top of an enclosure of the trailer and is connected to vertical ducts positioned adjacent the side walls and to floor ducts. U.S. Pat. No. 6,581,544 to Smith discloses an enclosed air conditioned trailer for transporting living fowl having an air conditioning system. Louvers are communicatively connected to a sensor for detecting carbon dioxide to control accumulation thereof within the enclosure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

The embodiments described herein relate to an animal transportation system configured to accommodate one or more live animals. The animal transportation system includes a floor, one or more cage assemblies, a securement system, and a circulation system. The one or more cage assemblies include one or more cages positioned in vertical alignment, a covering secured to and extending above the one or more cages, and at least one door assembly. Each of the at least one door assembly includes a pair of tracks having a door coupled thereto such that the door is movable along the pair of tracks. The pair of tracks extends from proximate the covering to proximate the floor in spaced relation laterally outward from the one or more cages and forms an access opening between the covering and the floor to access the one or more cages. The door is advanceable along the pair of tracks between an open position and a closed position. In the open position, a lower end of the door extends proximate the covering such that the access opening is not closed by the door. In the closed position, the lower end of the door extends proximate the floor closing the access opening with the door. The securement system secures the one or more cage assemblies to the floor in laterally spaced relationship from the pair of tracks such that the one or more cages are spaced laterally inward from the door of the at least one door assembly when the door is in the closed position. The circulation system has one or more vents for providing gas within an interior of the one or more cage assemblies and is configured to affect environmental conditions of the interior of the one or more cage assemblies. The gas circulated by the circulation system circulates between the one or more cages and the at least one door assembly.

The embodiments described herein relate to an animal transportation system that includes a sensor system having one or more sensors to monitor environmental conditions of at least an interior of the animal transportation system.

The embodiments described herein relate to an animal transportation system that includes a control system communicatively coupled to the circulation system to affect the environmental conditions of the interior of the one or more cage assemblies.

The embodiments described herein relate to an animal transportation system, wherein an interior of the animal transportation system includes a climate-controlled compartment. In an embodiment, the animal transportation system includes an air conditioning system unit secured below the floor of the animal transportation system. In an embodiment, the animal transportation system includes a forward wall sealingly coupled to a forward end of the one or more cage assemblies, a rearward wall sealingly coupled to a rearward end of the one or more cage assemblies, and the one or more cage assemblies are sealing coupled together, and the one or more cage assemblies, the forward wall, the rearward wall, and the floor form the climate-controlled compartment therein. In an embodiment of the animal transportation system, the circulation system is in flow communication with a stunning gas supply for providing stunning gas to induce an anesthetic state of unconsciousness or anoxia in one or more live animals and is configured to provide stunning gas to the climate-controlled compartment.

The embodiments described herein relate to an animal transportation system, wherein the door is a roller door that is rollable upward into the open position and unrollable downward into the closed position.

The embodiments described herein relate to an animal transportation system, wherein the securement system includes a plurality of angle irons moveable within a range of motion relative to the floor, and each of the one or more cage assemblies is secured to at least one of the plurality of angle irons.

The embodiments described herein relate to an animal transportation system that includes at least one coupler configured to flexibly couple adjacent cage assemblies of the one or more cage assemblies together, and the at least one coupler extends along lateral sides of the adjacent cage assemblies and upper portions thereof.

The embodiments described herein relate to an animal transportation system configured to accommodate one or more live animals. The animal transportation system includes: a floor, a plurality of cage assemblies, at least one coupler, a securement system, and a circulation system. The plurality of cage assemblies include one or more cages positioned in vertical alignment, a covering secured to and extending above the one or more cages, and one or more door assemblies. Each of the one or more door assemblies includes a door movable between at an open position and a closed position. In the closed position, the door is in covering relationship with an access opening to the one or more cages. The at least one coupler is configured to flexibly couple adjacent cage assemblies of the plurality of cage assemblies together. The securement system flexibly secures the plurality of cage assemblies to the floor. The circulation system has one or more vents for providing gas within an interior of the plurality of cage assemblies and is configured to affect environmental conditions of the interior of the plurality or cage assemblies. The at least one coupler and the securement system provide that adjacent cage assemblies of the plurality of cage assemblies are each independently moveable relative to each other.

The embodiments described herein relate to an animal transportation system that includes a sensor system having one or more sensors to monitor environmental conditions of at least an interior of the animal transportation system.

The embodiments described herein relate to an animal transportation system that includes a control system communicatively coupled to the circulation system to affect the environmental conditions of the interior of the plurality of cage assemblies.

The embodiments described herein relate to an animal transportation system, wherein an interior of the animal transportation system includes a climate-controlled compartment. In an embodiment, an air conditioning system unit is secured below the floor of the animal transportation system. In an embodiment, the animal transportation system includes a forward wall sealingly coupled to a forward end of the plurality of cage assemblies, a rearward wall sealingly coupled to a rearward end of the plurality of cage assemblies, and the plurality of cage assemblies are sealing coupled together, and the plurality of cage assemblies, the forward wall, the rearward wall, and the floor form the climate-controlled compartment. In an embodiment, the circulation system is in flow communication with a stunning gas supply for providing stunning gas to induce an anesthetic state of unconsciousness or anoxia in one or more live animals and is configured to provide stunning gas to the climate-controlled compartment.

The embodiments described herein relate to an animal transportation system, wherein the door of each of the one or more door assemblies is movable along a pair of tracks extending from proximate the covering to proximate the floor in spaced relation laterally outward from the one or more cages and forming the access opening. The door is advanceable along the pair of tracks between the open position and the closed position.

The embodiments described herein relate to an animal transportation system configured to accommodate one or more live animals. The animal transportation system includes a floor, one or more cage assemblies, a securement system, a forward wall, a rearward wall, and a circulation system. The one or more cage assemblies are sealing coupled together and include one or more cages positioned in vertical alignment, a covering secured to and extending above the one or more cages, and at least one door assembly. Each of the at least one door assembly includes a door movable between an open position and a closed position. In the closed position, the door is in spaced relation laterally outward from the one or more cages, is in covering relationship with an access opening to the one or more cages and is in sealing engagement with the floor. The securement system secures the one or more cage assemblies to the floor such that the one or more cages are in spaced relation laterally inward from the door of the at least one door assembly when the door is in the closed position. The forward wall is sealingly coupled to a forward end of the one or more cage assemblies. The rearward wall is sealingly coupled to a rearward end of the one or more cage assemblies. The circulation system has one or more vents for providing gas within an interior of the one or more cage assemblies and is configured to affect environmental conditions of the interior of the one or more cage assemblies. The floor, the one or more cage assemblies, the forward wall, and the rearward wall form a sealed compartment such that when the door is in the closed position in sealing engagement with the floor, the circulation system selectively in flow communication with a stunning gas supply is able to provide stunning gas to an interior of the sealed compartment and between the one or more cages and the door of the at least one door assembly to induce an anesthetic state of unconsciousness or anoxia in one or more live animals in the one or more cages.

The embodiments described herein relate to an animal transportation system that includes a sensor system having one or more sensors to monitor environmental conditions of at least the interior of the sealed compartment and a control system communicatively coupled to the sensor system and the circulation system to affect the environmental conditions of the interior of the sealed compartment.

BRIEF DESCRIPTION OF THE DRAWING FIGURES

Embodiments of the invention are described in detail below with reference to the attached drawing figures.

FIG. 1 is a side and top perspective view of an animal transportation system that forms a climate-controlled compartment and includes a plurality of openable doors in a closed position. A circulation system of the animal transportation system is flow connected to a pressure vessel configured to contain a stunning gas. A control system of the animal transportation system is communicatively coupled to a user device.

Figure 1:
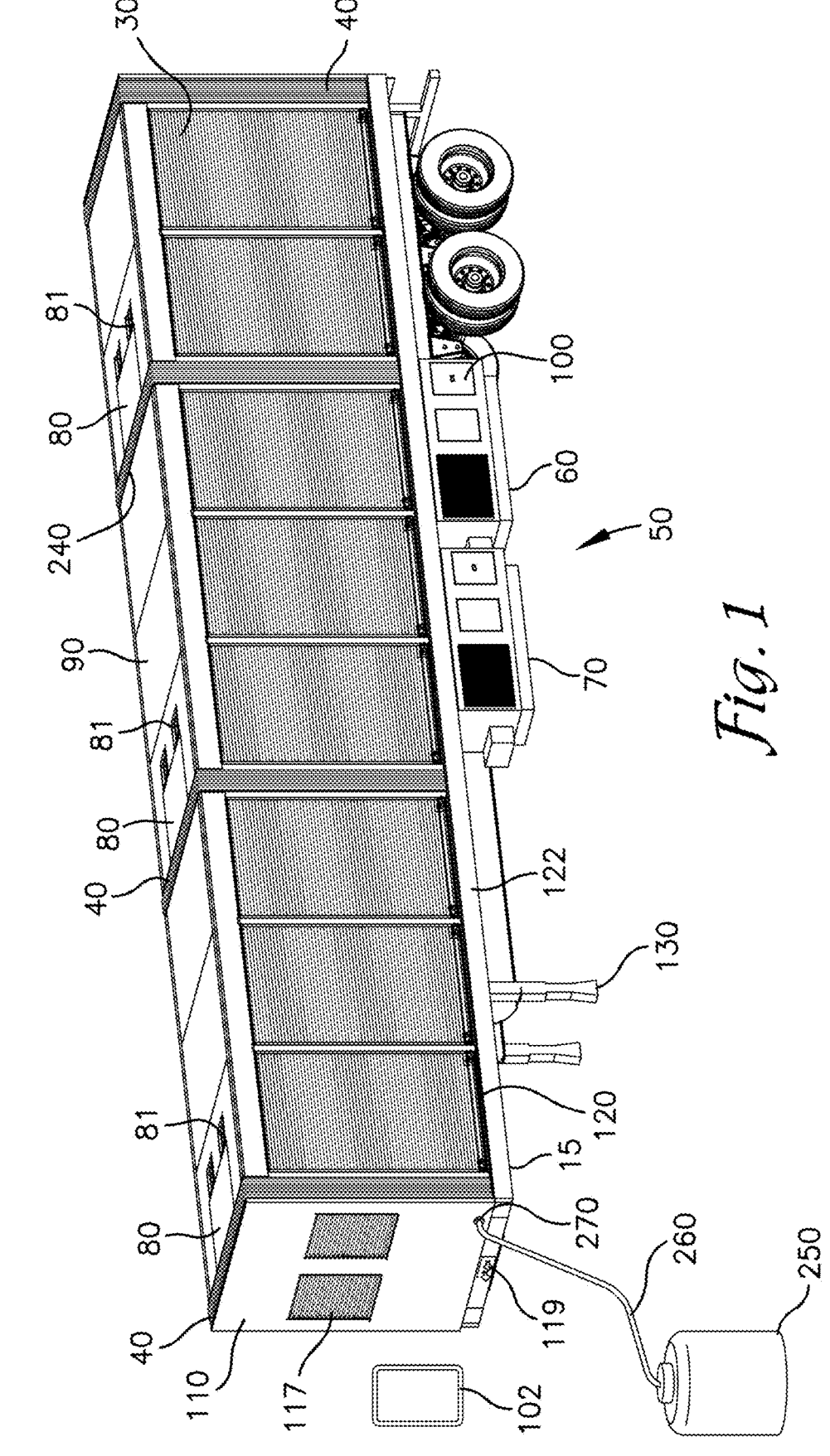
Figure 4:
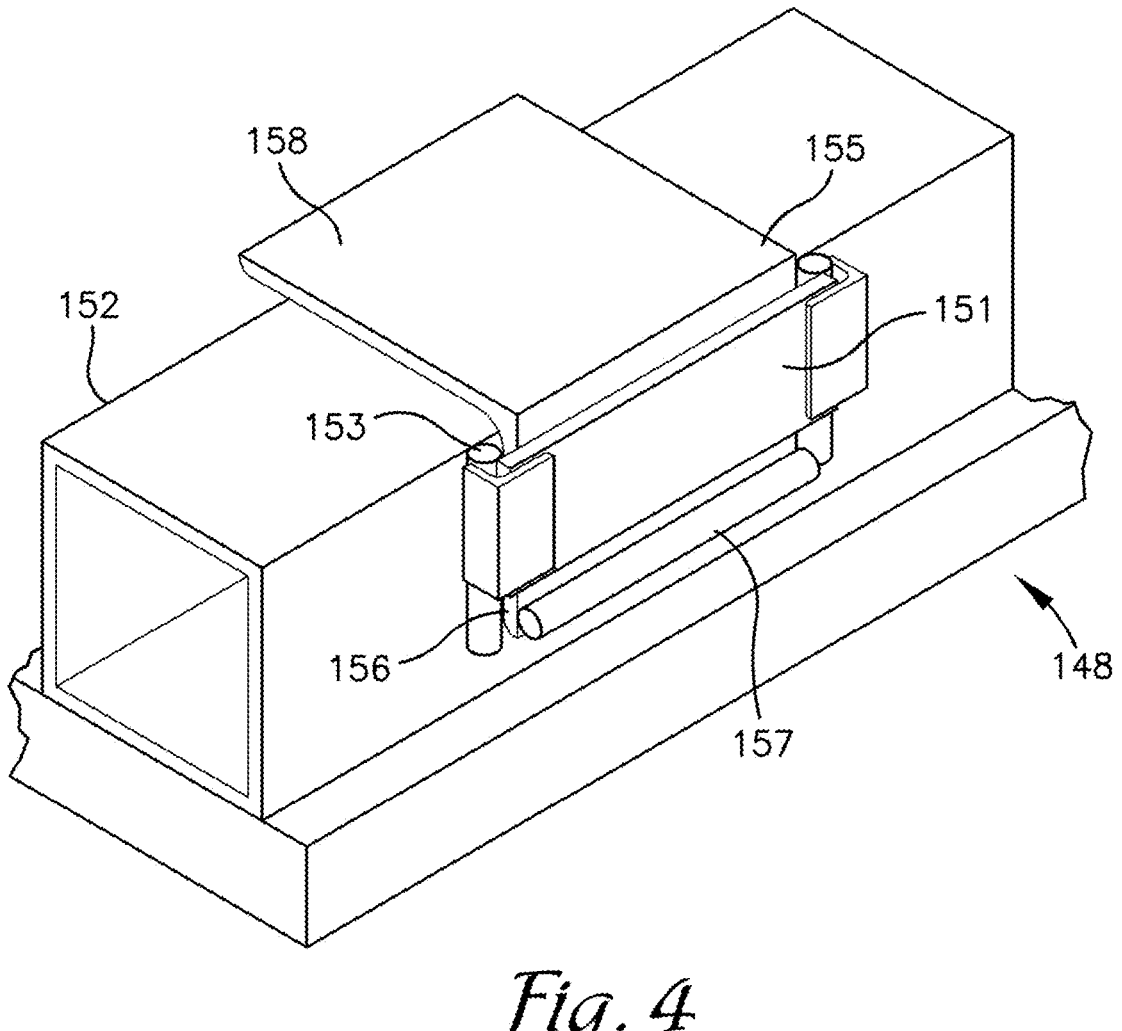

FIG. 4 is a perspective view of an embodiment of a securement system used in the animal transportation system of FIG. 1 to secure the cage assemblies to a flooring of the animal transportation system such that the plurality of cages are spaced apart from the openable door positioned in front of the plurality of cages. The securement system is configured such that at least a second leg of the angle iron extends through an opening in the flooring and above the flooring, and the cage assembly secured thereto is secured to the second leg.

Figure 5:
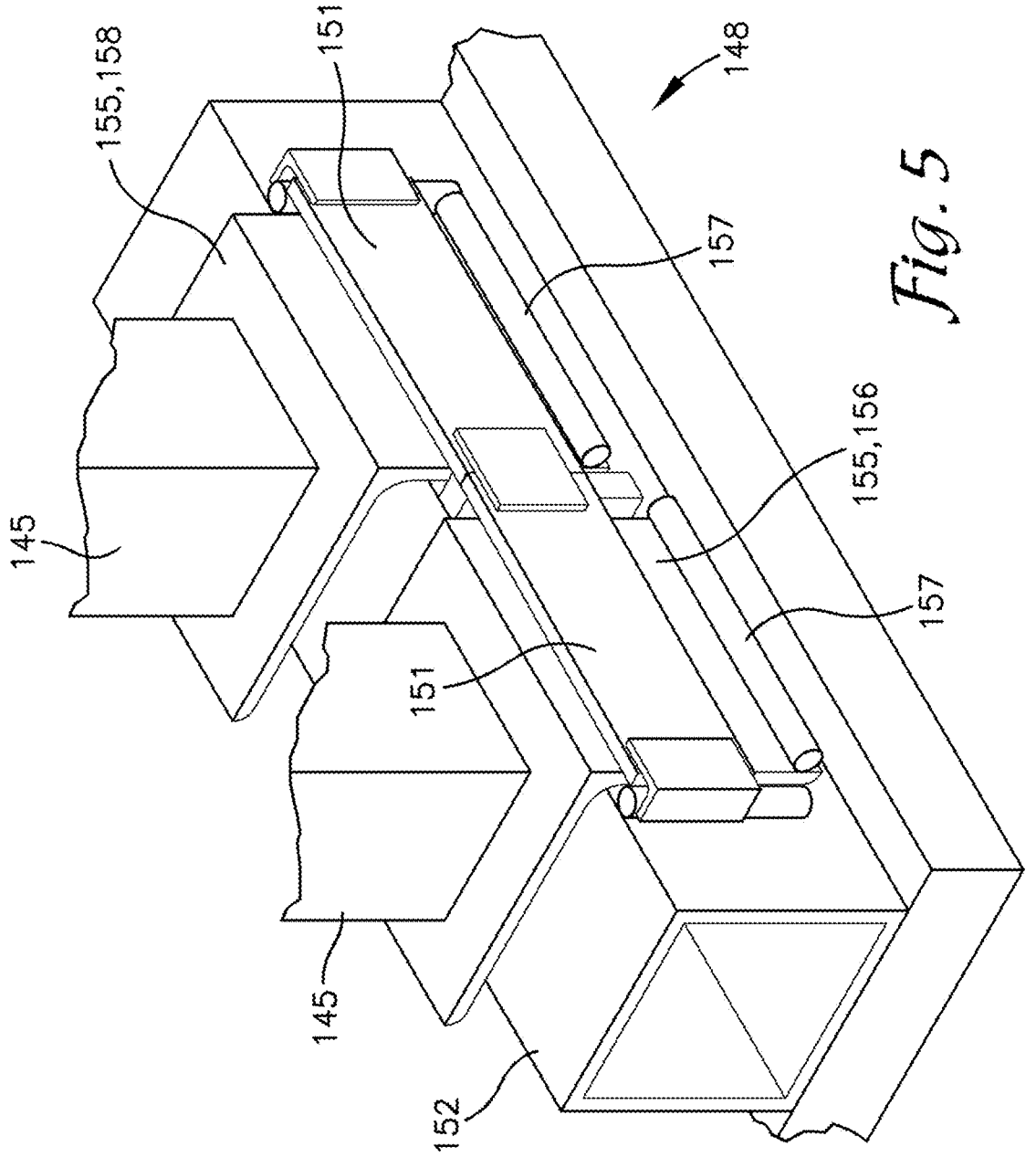

FIG. 5 is a perspective view of two of the securement systems shown in FIG. 4, with a first securement system secured to a first frame of a first cage assembly and a second securement system secured to a second frame of a second cage assembly.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

As used herein directional references may be made with respect to an operator or driver sitting in a cab of a powered semi-tractor unit or towing vehicle (not shown) coupled to an animal transportation system 10 and facing in a forward direction of travel, with lateral sides of the animal transportation system 10 including a left side or street side of the animal transportation system 10 located on a driver side of the towing vehicle and a right side or curbside of the animal transportation system 10 located on a passenger side of the towing vehicle. With reference to FIG. 1, the driver side of the animal transportation system 10 is shown, and a forward end of the animal transportation system 10 is to a left side of the page and a rearward end of the animal transportation system 10 is to a right side of the page. Similarly, a top surface or upper portion of the animal transportation system 10 extends toward a top of the page and a bottom surface or lower portion extends toward a bottom of the page.

Figure 2:
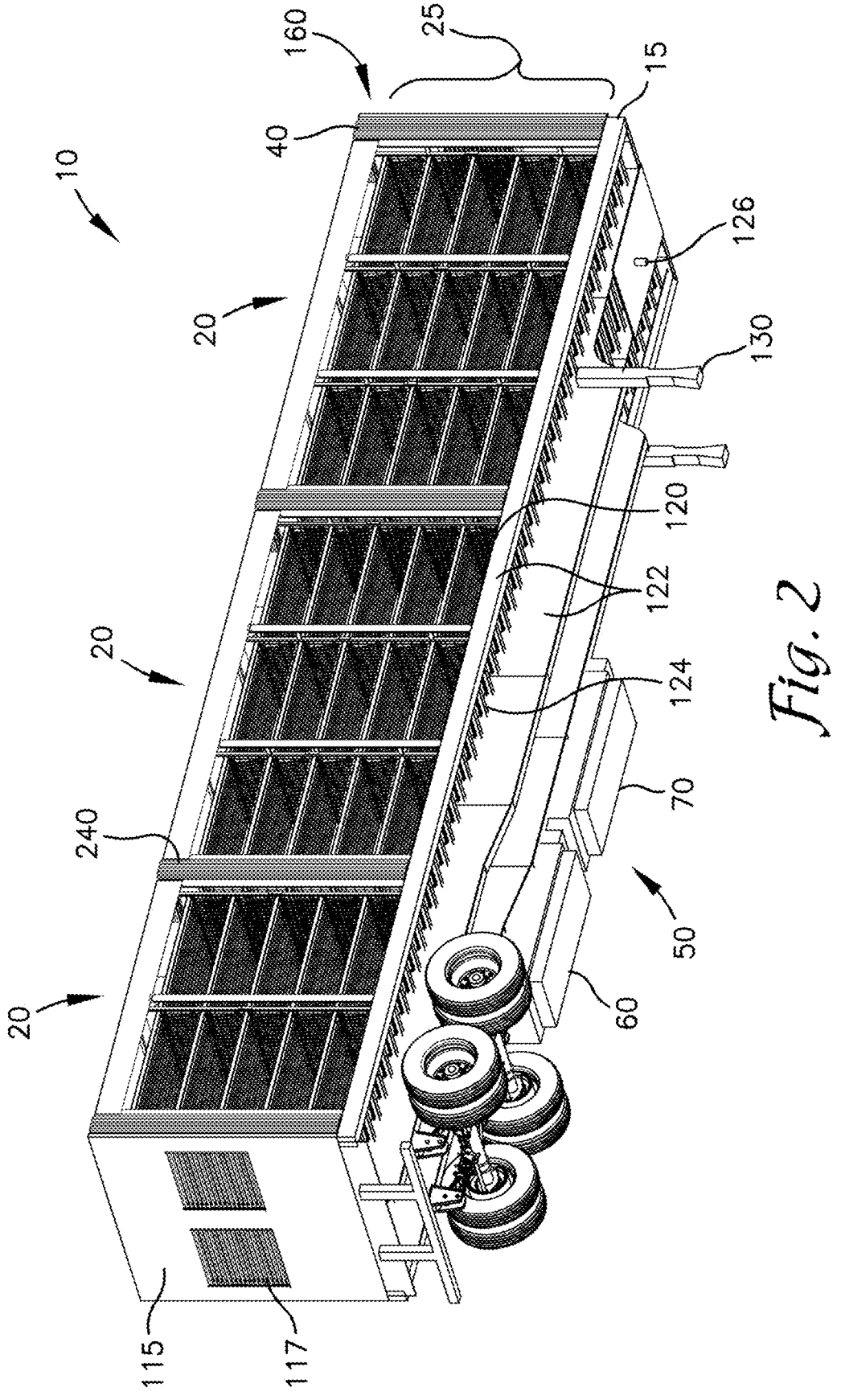
FIG. 2 is side and bottom perspective view of the animal transportation system shown in FIG. 1 and includes the plurality of openable doors in an open position and a plurality of cage assemblies.

An embodiment of the animal transportation system 10 includes a flatbed or platform trailer 15 having one or more coops or cage assemblies 20 coupled to and mounted thereon, as shown in FIG. 2. The passenger side of the animal transportation system 10 is shown in FIG. 2. In an embodiment, the cage assemblies 20 may be mounted to the flatbed or utility bed 15 of a utility vehicle. In FIG. 2, the platform trailer 15 is configured to be coupled to the towing vehicle with a hitch assembly, such as a fifth-wheel trailer coupling. The one or more cage assemblies 20 are fully enclosed within the animal transportation system 10 and comprise a plurality of levels of cages 25 positioned in vertical alignment. Each of the one or more cage assemblies 20 include at least one roller door 30 coupled thereto that may be uncoiled or unrolled and secured in a closed position or coiled or rolled upwardly into an open position. One or more couplers or sealing boots 40 flexibly couple adjacent cage assemblies 20 of the animal transportation system 10 on the platform trailer 15.

An embodiment of the animal transportation system 10 includes an air and circulation system 50 configured to affect environmental conditions of the interior of the animal transportation system 10, including cooling and/or heating an interior of the animal transportation system 10 and distributing carbon dioxide throughout the one or more cage assemblies 20 of the animal transportation system 10. The air and circulation system 50 may include a power supply or generator 60 and an air conditioning system that includes a compressor and condenser unit 70, both of which may be secured below the trailer 15, and one or more heating and/or ventilation units 80 that are mounted within an interior of the animal transportation system 10 and include at least one of one or more blowers, one or more exterior vents 81, one or more evaporators, and/or one or more overhead heating units. In an embodiment, the generator 60 may be mounted to the rearward end of the animal transportation system 10.

Figure 3:
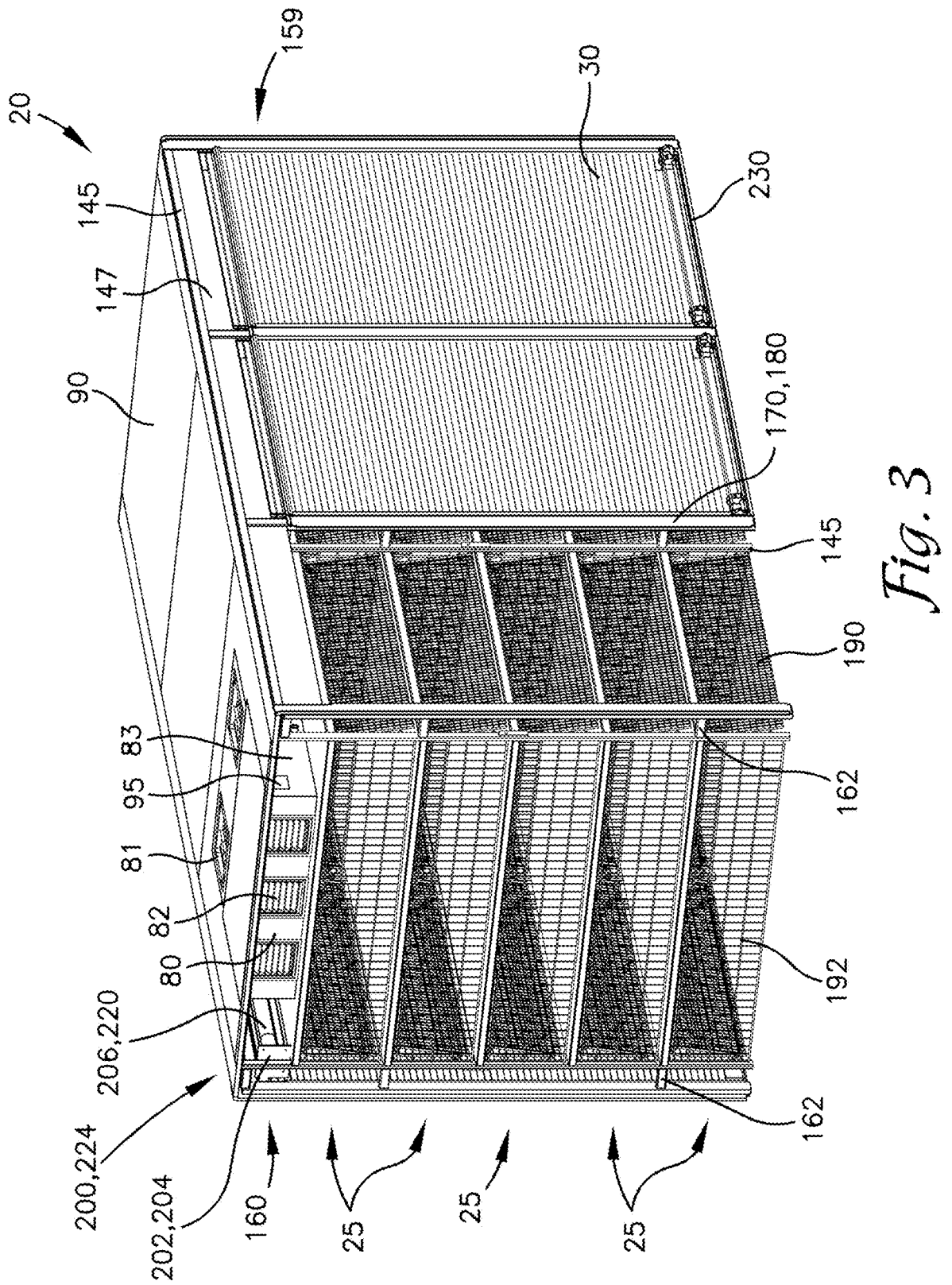
FIG. 3 is a perspective view of a cage assembly shown in the animal transportation system in FIG. 2 and includes two openable doors in the closed position and one openable door in the open position to show a plurality of cages with air ducts extending above the plurality of cages.

In an embodiment, the ventilation units 80 may be secured to a rooftop covering 90 and/or to the one or more cage assemblies 20 and be configured to uniformly circulate air and/or gases, including for cooling, heating, and/or distributing a stunning gas throughout the interior of the animal transportation system 10. The one or more exterior vents 81 may be used to circulate exterior air into an interior of the animal transportation system 10 or to exhaust interior air of the animal transportation system 10 to the environment. In an embodiment, the one or more exterior vents 81 may be closed or air circulation through the one or more exterior vents 81 blocked to prevent circulation between the exterior and the interior of the animal transportation system 10. Coolant lines (not shown) configured to contain a coolant or refrigerant may extend between the condenser unit 70 and the ventilation units 80 and function to cool an airflow through blowers of the ventilation units 80 and into the animal transportation system 10 or an airflow through the animal transportation system 10. In an embodiment, the coolant lines extend adjacent to at least one of the boots 40 or between cage assemblies 20 or adjacent the coverings 90. As shown in FIG. 3, the airflow flows from the ventilation units 80 into the interior of the animal transportation system 10 through vents 82 coupled to air ducts 83. The air ducts 83 may be flow connected to the one or more exterior vents 81. In the embodiment shown, the air ducts 83 and vents 82 are shown above the cages 25, but the air ducts 83 may extend to other areas of the interior of the animal transportation system 10 (e.g., between the cage assemblies 20 or adjacent to the boots 40) and include one or more vents 82 coupled thereto for directing or circulating the airflow to one or more of the areas. In an embodiment, the exterior vents 81 are closeable for air or gas recirculation within the interior of the animal transportation system 10, and the one or more vents 82 coupled to the air ducts 83 may include supply vents coupled to supply ducts that direct an airflow into the interior of the animal transportation system 10 and return vents coupled to return ducts that pull air into the air ducts 83 from the interior of the animal transportation system 10 and recirculate the airflow through the vents 82. In an embodiment, the return vents coupled to the return ducts may exhaust the airflow through the one or more exterior vents 81.

The animal transportation system 10 may also include an environmental monitoring system or sensor system 95 that may include one or more of various sensors to monitor the environmental conditions of the interior of the animal transportation system 10, including factors that contribute to air quality and air composition. Such factors may include temperature, humidity, static pressure, oxygen concentration, ammonia concentration, carbon dioxide ("CO2) concentration, and other foreseeable factors. The various sensors are positionable within an interior of the animal transportation system 10, such as adjacent to at least one of the boots or between the cage assemblies 20 or adjacent the coverings 90.

A control system 100 is communicatively coupled to the air and circulation system 50, including the ventilation units 80, and the sensor system 95. The control system 100 may be positioned under the platform trailer 15 and includes means for collecting and processing data and/or analyzing information from the sensor system 95. The control system 100 may also include a storage device that collects and stores data that is retrievable for review and/or analysis. The control system 100 regulates the operation of the air and circulation system 50 and the ventilation units 80 by comparing the environmental conditions of the interior of the animal transportation system 10 as communicated from the sensor system 95 to target conditions programmed in the control system 100, assessing the environmental conditions communicated thereto, which may include assessing the exterior conditions thereof, and engaging the air and circulation system 50 such that the interior of the animal transportation system 10 complies with the target conditions. The control system 100 may be communicatively coupled, such as via a personal, local, or wide area network connection, to one or more user interfaces that may include wired or wireless control or monitoring modules or user devices 102, such as a handheld device, a cellular phone, a laptop, a computer, or another foreseeable receiver, which may be located with a user in an immediate vicinity, such as a user in the cab of the towing truck, and/or remotely, such as a user in an office. The user may be able to monitor the environmental conditions within the animal transportation system 10 in real time and to control the air and circulation system 50 and the ventilation units 80 of the animal transportation system 10 with the user device 102 as a result of such information.

The platform trailer 15 is a conventional trailer that is known in the art and configured to transport cage assemblies 20 secured thereto. The platform trailer 15 includes a bulk head or headboard or forward wall 110 coupled to the forward end of the animal transportation system 10 that is configured to prevent forward movement of cargo, i.e. live animals, loaded therein and to protect the driver. In an embodiment, the headboard 110 may be coupled to the boot 40 that is a forward boot positioned at the forward end of the animal transportation system 10. The platform trailer 15 also includes a rearward wall 115 that encloses the rearward end of the animal transportation system 10 and that may include components known in the art, such as, for example, bumpers and lights. In an embodiment, the rearward wall 115 may be coupled to the boot 40 that is a rearward boot positioned at the rearward end of the animal transportation system 10. In an embodiment, the headboard 110 and the rearward wall 115 may have one or more openable vents 117 formed therein for air circulation which may be utilized as an alternative air circulation device and as part of the air and circulation system 50. For example, the vents may include openings having actuatable louvers that may be advanced by a user and/or the control system 100 as described herein. In an embodiment the louvers may be manually adjustable and/or actuatable via the control system 100. In an embodiment, a fan (not shown) is secured in the vent to facilitate air circulation within the interior of the animal transportation system 10.

In an embodiment the headboard 110 includes a plurality of couplers 119 that are configured to connect the animal transportation system 10 to the towing vehicle. At least two of the plurality of couplers 119 are configured to support connections known in the art that join a brake system of the trailer 15 to a brake system of the towing vehicle. Specifically, the couplers 119 support a first connection or service air line and a second connection or emergency air line. The plurality of couplers 119 may also include a coupler 119 that is configured to support an electrical connection between the platform trailer 15 and the towing vehicle.

The platform trailer 15 includes a platform or floor 120 that is supported by a mainframe 122 that extends along an outside and along a longitudinal axis of the platform trailer 15 and a plurality of crossbeams 124 that are supported by and extend within the mainframe 122. In an embodiment, the crossbeams 124 have a width that is approximately the same as or slightly less than a width of the platform trailer 15. The plurality of crossbeams provide structure to support the animal transportation system 10 and the floor 120 supports the cage assemblies 20 thereon. As used herein, the terms platform or floor or flooring may include any support structure including frame members or floorboards or the like forming a base structure for supporting other items including for example cages or to which such items may be secured.

The platform trailer 15 includes a kingpin or a coupler 126 secured toward the forward end of the bottom surface of the platform trailer 15 that is configured to provide a pivot point between the platform trailer 15 and the towing vehicle such that the platform trailer 15 is rotatably coupled thereto. The kingpin 126 is known in the art and includes a narrowed shaft that has a smaller diameter than portions of the kingpin above and below the narrowed shaft. A coupling mechanism, such as the fifth-wheel trailer coupling or kingpin locking jaw, may securely connect the platform trailer 15 to the towing vehicle.

In an embodiment, the platform trailer 15 includes landing gear 130 that is actuatable to support the animal transportation system 10 when the animal transportation system 10 is disconnected from and not supported by the towing vehicle. The landing gear 130 is vertically adjustable to adjust the height of the forward end of the animal transportation system 10, such as during a coupling process of connecting the platform trailer 15 to the towing process.

As shown in FIG. 3, the cage assemblies 20 are configured to form a climate-controlled and/or sealed compartment with the platform trailer 15 to safely transport small animals, such as living fowl, from the farm to the processing center. Each cage assembly 20 comprises a plurality of cages 25 secured together or formed integrally in vertical alignment to form a plurality of levels of cages 25. The cage assemblies 20 are mounted to the platform 120 of the platform trailer 15 such that the plurality of cages 25 in vertical alignment are spaced apart from an outside edge of the mainframe 122 of the platform trailer 15 to provide a space for circulation of gases between the roller doors 30 and the cage assemblies 20, between the plurality of levels of cages 25, and between different cage assemblies 20. The cage assemblies 20 each include the at least one roller door 30 on at least one of a long or lateral side of the animal transportation system 10 that is openable upward and the rooftop covering or one or more overhead panels 90 coupled to a top of the cage assemblies 20. The platform 120, the headboard 110, the rearward wall 115, the boots 40, and the one or more cage assemblies 20 are configured to form the interior of the animal transportation system 10 that forms the climate-controlled compartment within the animal transportation system 10. In an embodiment, at least one of the headboard 110, the rearward wall 115, the coverings 90, and the roller doors 30 are insulated for energy efficiency. In an embodiment, a heat reflective paint is used on an exterior of the animal transportation system 10 to increase energy efficiency.

The rooftop covering 90 extends over each of the cage assemblies 20 and is sealingly coupled to one or more boots 40 at each end thereof. The coverings 90 are secured to a top of a frame 145 of the cage assemblies 20 to form a ceiling of the cage assemblies 20. The coverings 90 may also include an eave or projection 147 that projects over a roller door assembly 159. The one or more exterior vents 81 extend through the coverings 90.

The cage assemblies 20 are flexibly secured on the platform 120 to the platform trailer 15 spaced apart from the outside edge of the mainframe 122 of the platform trailer 15 with a securement system comprising one or more securement systems 148, shown in FIGS. 4 and 5, for securing each cage assembly 20 to the platform trailer 15. Each cage assembly 20 is secured to the platform trailer 15 with one or more securement systems 148 extending through one or more apertures or slots (not shown) formed in the platform 120 of the platform trailer 15. In an embodiment, the one or more securement systems 148 are spaced apart from the outside edge of the mainframe 122 of the platform trailer 15. The securement systems 148 extend from or are coupled to a bottom portion of the cage assemblies 20, such as adjacent one or more corners of the cage assemblies 20 or in other locations adjacent the bottom portion of the cage assemblies 20, to secure the cage assemblies 20 to the platform trailer 15. In an embodiment, a bottom section of the frame 145 of the cage assembly 20 is welded to a top of the securement system 148. Each one or more securement system 148 extends through the aperture in the floor 120 and is secured, such as by welding or bolting, to a securing beam of the platform trailer 15, such as one of the crossbeams 124 supported by the mainframe 122, the mainframe 122, or another support beam. In an embodiment, the one or more securement systems 148 are moveable within a range of motion relative to the platform trailer 15 to minimize movement transference between the platform trailer 15 and the cage assemblies 20. Each of the one or more securement systems 148 may be independently moveable, such that each of the cage assemblies 20 is able to move independently from an adjacent cage assembly 20. In an embodiment, the securement system 148 is a floating or dampening system that controls or reduces the effects on the cage assemblies 20 of excessive or unwanted motion of the animal transportation system 10 and may allow a degree of movement to the cage assemblies 20 relative to the platform trailer 15 during transit to alleviate flex from the platform trailer 15 transferring to the cage assemblies 20 and to dampen or absorb such motion.

Each securement system 148 for securing the cage assembly 20 to the platform trailer 15 includes a flat iron 151 secured to a securing beam 152 of the platform trailer 15. In an embodiment, the securing beam 152 extends under the floor 120, and a portion of the flat iron 151 extends through an aperture in the floor 120 and in engagement with the cage assemblies 20. The flat iron 151 is spaced apart from the securing beam 152 with spacers 153 such that an angle iron 155 is flexibly securable therebetween. A first leg 156 of the angle iron 155 extends approximately vertically between the flat iron 151 and the securing beam 152 and is able to move vertically. The first leg 156 includes a limiting rod 157 secured or welded to a bottom thereof to limit upward movement of the angle iron 155 and prevent the angle iron 155 coming out of the space formed between the flat iron 151 and the securing beam 152. A second leg 158 of the angle iron 155 extends approximately horizontally over the securing beam 152 and is configured to secure the cage assembly 20 thereto. FIG. 5 shows the frame 145 of the cage assembly 20 secured to the second leg 158 of the angle iron 155. In an embodiment, the first leg 156 extends through an aperture in the floor 120, and the second leg 158 extends over the floor 120, such that the angle iron 155 is able to move vertically relative to the floor 120.

The dimensions of the cage assemblies 20 are configured to maximize a space for the animals in the cage assemblies 20 in the interior of the animal transportation system 10. Each of the cage assemblies 20 has a width or longitudinal dimension that is approximately equivalent to a width of the roller door 30 coupled thereto, and the width of the one or more cage assemblies 20 is further dependent on a length of the platform trailer 15. Each cage assembly 20 may have a similar width or may have a different width than the other cage assemblies 20 depending on the widths of the other cage assemblies 20 and a total length of the animal transportation system 10.

FIG. 2 shows an embodiment of the animal transportation system 10 that includes the roller doors 30 removed to show the cage assemblies 20 secured within the animal transportation system 10. FIG. 3 shows an embodiment of a cage assembly that includes one of the roller doors 30 removed to show the plurality of cages 25 therein. The cage assemblies 20 each comprise the frame 145 that forms or supports the plurality of levels of cages 25 and each level of cages 25 depends from a previous level of cages 25. Each level of cages 25 is configured to support one or more live animals. In an embodiment shown in FIG. 2, three cage assemblies 20 are provided in the animal transportation system 10. In an embodiment shown, each cage assembly 20 comprises five levels of cages 25 for transporting fowl and an uppermost level 160 that may be configured to support peripheral structures that support the air and circulation system 50 and/or the heating and ventilation unit 80 or other systems within the animal transportation system 10. In an embodiment, the uppermost level 160 has a height that is less than a height of the cages 25. In an embodiment, each cage assembly 20 has one or more levels of cages 25 sized to accommodate one or more live animals to be transported, and each cage assembly 20 may have more or fewer levels of cages 25 than those shown in the cage assemblies 20 in FIGS. 2 and 3.

The frame 145 of the cage assemblies 20 each include a plurality of supports 162 that extend laterally from the cages 25 toward the outside edge of the mainframe 122 of the platform trailer 15 to support track frame members 170. The track frame members 170 extend vertically and include a track or side channel 180 secured to or formed therein that is configured to support a lateral edge or an outer edge of each of the roller doors 30 as the roller doors 30 are advanced to the closed position or the open position. Each of the roller doors 30 supported by the vertically extending side channels 180 is configured such that when the roller door 30 is in the closed position, the roller doors 30 extend in a vertical plane parallel to and/or in approximate alignment with a vertical plane extending through or coplanar with an outside edge of the floor 120 or a vertical edge of the mainframe 122 of the platform trailer 15, and when the roller doors 30 are in the open position, the roller doors 30 coil adjacent the covering 90 and/or behind the projection 147. The engagement of the roller doors 30 with the side channels 180 that are secured to the cage assemblies 20 provides the roller doors 30 with a degree of freedom of movement with the cage assemblies 20.

The plurality of cages 25 of each cage assembly 20 are secured together in vertical alignment and provide a space for a plurality of living animals to be transported. The cage assemblies 20 are configured for circulation of cooled and/or heated air or gases through the plurality of cages 25. Each level of cages 25 includes a door 190 that is openable on one or both of the lateral sides of the animal transportation system 10 to contain animals within the respective cage 25. The doors 190 are spaced apart from the roller doors 30 when the roller doors 30 are in a closed position. Sidewalls 192 extend between the lateral sides of the cage assembly 20. A mesh or fence material is provided on at least doors 190 and the sidewalls 192 of each cage assembly 20 to contain the live animals in each of the cages 25 during transportation and enable air circulation between the cages 25. The floor 120 of each of the plurality of cages 25 may be formed from a composite material.

In an embodiment, the roller doors 30 extend on both lateral sides of the animal transportation system 10 and the doors 190 of the cages 25 are openable along the driver side and the passenger side of the animal transportation system 10. In an embodiment, the animal transportation system 10 includes roller doors 30 extending on one lateral side of the animal transportation system 10 and the doors 190 of the cages are openable on at least the same side as the roller doors 30.

The roller doors 30 are coupled to and move along the side channels 180 of the support frame members 170 that are secured to and spaced apart from the frame 145 supporting the cage assemblies 20. FIG. 1 shows an embodiment of the animal transportation system 10 that includes the roller doors 30 in the closed position on the driver side of the animal transportation system 10. The roller doors 30 form at least one of the lateral walls of the animal transportation system 10 and may be coupled to one or both sides of the cage assemblies 20 to provide access to the cage assemblies 20 from one or both sides of the animal transportation system 10. Preferably, the roller doors 30 form both sidewalls of the animal transportation system 10, including a driver side sidewall and a passenger side sidewall of the animal transportation system 10. The roller doors 30 may be formed from interlocking slats or sheets of corrugated metal. The metal slats may be lock seamed together such that adjacent metal slats are able to rotate relative to each other when the roller doors 30 are coiled and uncoiled. The roller doors may be formed from a variety of materials to form hard roller doors, including steel, stainless steel, galvanized steel, aluminum, polycarbonate, acrylic, polyvinyl chloride (PVC), and/or other materials known in the art.

In an embodiment, the roller doors 30 are insulated and provide a seal to prevent leakage of cooled or heated air or gases and to protect the interior of the animal transportation system 10 from weather. The seal may be positioned at least between the roller doors 30 and the track frame members 170 and along a lower edge of the roller doors 30. A flexible extrusion may also be installed between the slats that form the roller doors 30 to provide a seal.

The roller door assembly 159 comprises a header assembly 200 that includes a bracket 202 that is secured to or positioned adjacent to the covering 90, such as behind the projection 147. The bracket 202 may include a plate 204 that extends on each side of each roller door 30. A shaft or roller tube 206 is rotatably secured between the plates 204 of the bracket 202. In an embodiment, the roller door assembly 159 is motorized and a gearbox 220 for driving the roller door 30 is located adjacent to the bracket 202. In an embodiment, the gearbox 220 of the roller door assembly 159 is positioned within the roller tube 206 to minimize the footprint thereof. A controller 224 may be mounted adjacent to the header assembly 200 and include a sensing system having sensors to control travel of the roller doors 30, sensing when the roller doors 30 are in the closed position or in the open position, and provide safety mechanisms, such as auto-reverse when an obstruction is encountered by the door. In an embodiment, the roller door assembly 159 include one or more cogs or sprockets or gears that positively drive the roller doors 30.

The roller door assembly 159 may be communicatively connected to a wireless or wired remote to control opening and closing the roller doors 30. The remote may be accessed on the user device 102 as described herein. The roller doors 30 may be locked into the closed or open position via a powered auto-locking assembly within the header assembly 200. In an embodiment, the roller doors 30 may be locked into the closed position via a fastener mounted adjacent the floor 120 or the mainframe of the platform trailer 15 and couplable thereto.

Each roller door 30 is coilable or rollable about the shaft 206. Each side of the roller door 30 is secured within the side channels 180 to guide the roller door 30. The side channels 180 may be C-shaped, and the roller door 30 may include one or more guides or rollers extending therefrom that engage the side channels 180. The side channels 180 and the bottom of the roller door 30 may include seals 230 to prevent dirt and moisture from entering the interior of the animal transportation system 10 and to prevent leakage of cooled or heated air or gases to the environment when the roller doors 30 are in the closed position.

The boots 40 flexibly and sealingly couple neighboring cage assemblies 20 along the sides and a top thereof and provide a degree of flexibility to the animal transportation system 10 that allows separate movement of each of the cage assemblies 20 during transit to flex or to minimize transference of movement between the cage assemblies 20 and from the platform trailer 15 to the cage assemblies 20. Each boot 40 is secured to and extends along at least each of the sides and the top of the cage assemblies 20. As shown in FIG. 1, three cage assemblies 20 of the animal transportation system 10 are flexibly coupled together by two boots 40, and the animal transportation system 10 further includes a boot 40 between the headboard 110 and the furthest forward cage assembly 20 and a boot 40 between the rearward wall 115 and the furthest rearward cage assembly 20. In an embodiment each boot 40 is formed with a series of flexible sections that are configured to expand and contract or flex to dampen movement between the cage assemblies 20. The series of flexible sections of the boot 40 may include accordion- or concertinaed-folds to flexibly couple the cage assemblies 20.

Each boot 40 also provides a seal 240 that enables the animal transportation system 10 to form the climate-controlled and/or sealed compartment that is able to maintain a temperature-controlled environment and/or to contain stunning gases released by the air and circulation system 50. The boots 40 are preferably formed from a durable rubber material that has low gas permeability and is resistant to weather. The boot 40 includes a flexible, spring clip or coupling assembly (not shown) on each side thereof that is configured to secure and sealingly couple the boot 40 to the frames 145 of the cage assemblies 20, such as the track support frame member 170 or a boot support frame member, to the headboard 110 and the rearward wall 115, and to the coverings 90 of the cage assemblies 20.

The animal transportation system 10 is configured to support stunning of live animals with a stunning gas that may comprise gaseous $CO_2$ prior to processing. Controlled atmosphere stunning (CAS) is a humane slaughter method in which the stunning gas is used to stun live animals to induce an anesthetic state of unconsciousness and insensibility that is sufficient such that the animal does not recover prior to death or produce anoxic loss of consciousness and killing by anoxia before slaughter. Gaseous $CO_2$ may be provided to the animal transportation system 10 at optimized concentrations and durations directed to stun small animals, such as fowl. In an embodiment, liquified gaseous $CO_2$ is stored in a pressure vessel 250 and gaseous $CO_2$ is supplied therefrom to an interior of the animal transportation system 10 through the air and circulation system 50. A $CO_2$ line 260 extends from the pressure vessel 250 to an inlet nipple or coupler 270 of the animal transportation system 10. The inlet nipple 270 is flow connected to the ventilation units 80 of the air and circulation system 50 and blowers disperse the gaseous $CO_2$ to achieve an approximately consistent concentration throughout the interior of the animal transportation system 10. It is foreseeable that another gaseous mixture could be used instead of $CO_2$ to induce the anesthetic state before slaughter.

The control system 100 is configured to control the CAS process and monitor factors in the animal transportation system 10 during the CAS process that may affect the efficiency and efficacy of the stunning gas on the animals, including, for example, the concentration of stunning gas in the animal transportation system 10, a duration of exposure to the stunning gas by the animals, a quality of the stunning gas, and/or a temperature of the stunning gas. The control system 100 may be communicatively connected to the pressure vessel 250 and/or the inlet nipple 270 to control the flow of stunning gas into the animal transportation system 10. Data for the factors associated with the CAS process may be communicated to the user device 102 and controlled autonomously by the control system 100 and/or by a user through the user device 102.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

What is claimed is:

1. An animal transportation system configured to accommodate one or more live animals, the animal transportation system comprising:

a floor;

one or more cage assemblies comprising, one or more cages positioned in vertical alignment, a covering secured to and extending above the one or more cages, and at least one door assembly, each of the at least one door assembly comprising a pair of tracks having a door coupled thereto such that the door is movable along the pair of tracks, the pair of tracks extending from proximate the covering to proximate the floor in spaced relation laterally outward from the one or more cages and forming an access opening between the covering and the floor to access the one or more cages, the door advanceable along the pair of tracks between an open position wherein a lower end of the door extends proximate the covering such that the access opening is not closed by the door and a closed position wherein the lower end of the door extends proximate the floor closing the access opening with the door;

a securement system securing the one or more cage assemblies to the floor in laterally spaced relationship from the pair of tracks such that the one or more cages are spaced laterally inward from the door of the at least one door assembly when the door is in the closed position; and a circulation system having one or more vents for providing gas within an interior of the one or more cage assemblies, the circulation system configured to affect environmental conditions thereof; and wherein the gas circulates between the one or more cages and the at least one door assembly.

2. The animal transportation system of claim 1, further comprising a sensor system having one or more sensors to monitor environmental conditions of at least an interior of the animal transportation system.

3. The animal transportation system of claim 1, further comprising a control system communicatively coupled to the circulation system to affect the environmental conditions of the interior of the one or more cage assemblies.

4. The animal transportation system of claim 1, wherein an interior of the animal transportation system comprises a climate-controlled compartment.

5. The animal transportation system of claim 4, further comprising an air conditioning system unit secured below the floor of the animal transportation system.

6. The animal transportation system of claim 4, further comprising a forward wall sealingly coupled to a forward end of the one or more cage assemblies, and a rearward wall sealingly coupled to a rearward end of the one or more cage assemblies, wherein the one or more cage assemblies are sealing coupled together, and the one or more cage assemblies, the forward wall, the rearward wall, and the floor form the climate-controlled compartment therein.

7. The animal transportation system of claim 4, wherein the circulation system is in flow communication with a stunning gas supply for providing stunning gas to induce an anesthetic state of unconsciousness or anoxia in one or more live animals and is configured to provide stunning gas to the climate-controlled compartment.

8. The animal transportation system of claim 1, wherein the door is a roller door that is rollable upward into the open position and unrollable downward into the closed position.

9. The animal transportation system of claim 1, wherein the securement system includes a plurality of angle irons moveable within a range of motion relative to the floor, and each of the one or more cage assemblies is secured to at least one of the plurality of angle irons.

10. The animal transportation system of claim 1, further comprising at least one coupler configured to flexibly couple adjacent cage assemblies of the one or more cage assemblies together, the at least one coupler extending along lateral sides of the adjacent cage assemblies and upper portions thereof.

11. An animal transportation system configured to accommodate one or more live animals, the animal transportation system comprising:

a floor;

a plurality of cage assemblies comprising, one or more cages positioned in vertical alignment, a covering secured to and extending above the one or more cages, and one or more door assemblies, each of the one or more door assemblies comprising a door movable between at an open position and a closed position, wherein in the closed position the door is in covering relationship with an access opening to the one or more cages;

at least one coupler configured to flexibly couple adjacent cage assemblies of the plurality of cage assemblies together;

a securement system flexibly securing the plurality of cage assemblies to the floor;

a circulation system having one or more vents for providing gas within an interior of the plurality of cage assemblies, the circulation system configured to affect environmental conditions thereof; wherein:

the at least one coupler and the securement system provide that adjacent cage assemblies of the plurality of cage assemblies are each independently moveable.

12. The animal transportation system of claim 11, further comprising a sensor system having one or more sensors to monitor environmental conditions of at least an interior of the animal transportation system.

13. The animal transportation system of claim 11, further comprising a control system communicatively coupled to the circulation system to affect the environmental conditions of the interior of the plurality of cage assemblies.

14. The animal transportation system of claim 11, wherein an interior of the animal transportation system comprises a climate-controlled compartment.

15. The animal transportation system of claim 14, further comprising an air conditioning system unit secured below the floor of the animal transportation system.

16. The animal transportation system of claim 14, further comprising a forward wall sealingly coupled to a forward end of the plurality of cage assemblies, and a rearward wall sealingly coupled to a rearward end of the plurality of cage assemblies, wherein the plurality of cage assemblies are sealing coupled together, and the plurality of cage assemblies, the forward wall, the rearward wall, and the floor form the climate-controlled compartment.

17. The animal transportation system of claim 14, wherein the circulation system is in flow communication with a stunning gas supply for providing stunning gas to induce an anesthetic state of unconsciousness or anoxia in one or more live animals and is configured to provide stunning gas to the climate-controlled compartment.

18. The animal transportation system of claim 11, wherein the door of each of the one or more door assemblies is movable along a pair of tracks extending from proximate the covering to proximate the floor in spaced relation laterally outward from the one or more cages and forming the access opening, the door advanceable along the pair of tracks between the open position and the closed position.

19. An animal transportation system configured to accommodate one or more live animals, the animal transportation system comprising:

a floor;

one or more cage assemblies sealing coupled together, the one or more cage assemblies comprising, one or more cages positioned in vertical alignment, a covering secured to and extending above the one or more cages, and at least one door assembly, each of the at least one door assembly comprising a door movable between an open position and a closed position, wherein in the closed position the door is in spaced relation laterally outward from the one or more cages, is in covering relationship with an access opening to the one or more cages and is in sealing engagement with the floor;

a securement system securing the one or more cage assemblies to the floor such that the one or more cages are in spaced relation laterally inward from the door of the at least one door assembly when the door is in the closed position;

a forward wall sealingly coupled to a forward end of the one or more cage assemblies;

a rearward wall sealingly coupled to a rearward end of the one or more cage assemblies;

a circulation system having one or more vents for providing gas within an interior of the one or more cage assemblies, the circulation system configured to affect environmental conditions thereof; wherein:

the floor, the one or more cage assemblies, the forward wall, and the rearward wall form a sealed compartment, and when the door is in the closed position in sealing engagement with the floor, the circulation system selectively in flow communication with a stunning gas supply provides stunning gas to an interior of the sealed compartment and between the one or more cages and the door of the at least one door assembly to induce an anesthetic state of unconsciousness or anoxia in one or more live animals in the one or more cages.

20. The animal transportation system of claim 19, further comprising a sensor system having one or more sensors to monitor environmental conditions of at least the interior of the sealed compartment and a control system communicatively coupled to the sensor system and the circulation system to affect the environmental conditions of the interior of the sealed compartment.

* * * * *